United States Patent [19]

Boucouvalas

[11] Patent Number: 4,737,002

[45] Date of Patent: Apr. 12, 1988

[54] TUNABLE OPTICAL DIRECTIONAL COUPLERS

[75] Inventor: Anthony C. Boucouvalas, Middlesex, England

[73] Assignee: The General Electric Company, p.l.c., England

[21] Appl. No.: 92,234

[22] Filed: Sep. 2, 1987

Related U.S. Application Data

[63] Continuation of Ser. No. 799,626, Nov. 19, 1985, abandoned.

[30] Foreign Application Priority Data

Nov. 21, 1984 [GB] United Kingdom ............... 8429430

[51] Int. Cl.⁴ .............................................. G02B 6/26
[52] U.S. Cl. .............................. 350/96.13; 350/96.14; 350/96.15
[58] Field of Search ............... 350/96.13, 96.14, 96.15, 350/96.16, 96.29

[56] References Cited

FOREIGN PATENT DOCUMENTS 59-15225 1/1984 Japan ................................. 350/96.15

Primary Examiner—John Lee
Assistant Examiner—John Ngo
Attorney, Agent, or Firm—Kirschstein, Kirschstein, Ottinger & Israel

[57] ABSTRACT

Optical couplers, whether in integrated or fibre optics, where there is at least one input lightpath coupled to two or more output lightpaths by depositing a film of resistive metal over the coupling region and passing current through the film. This heats up the coupler and thus increases the refractive index forming a preferential light path through the heat region. Thus by heating particular regions, and by varying current through the film, the coupler is tuned as desired.

4 Claims, 2 Drawing Sheets

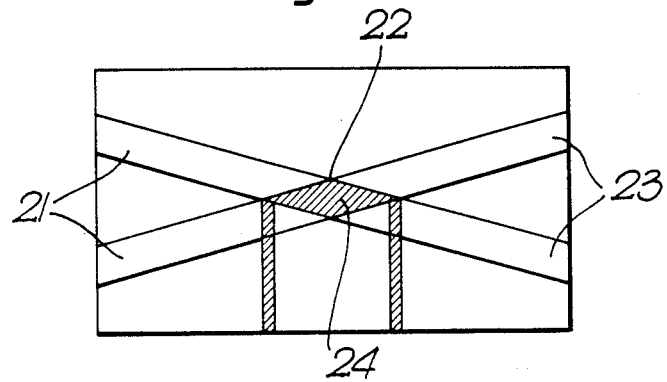
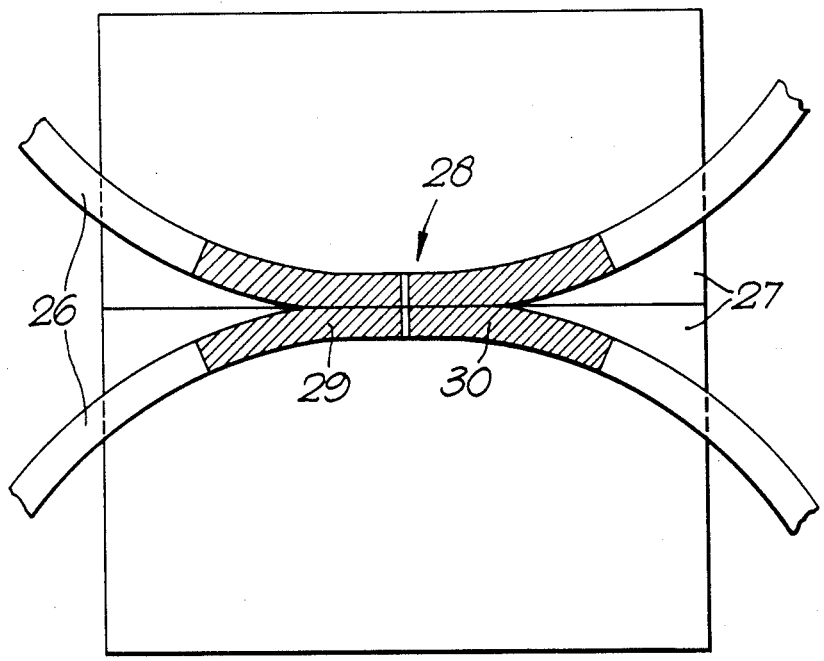

TUNABLE OPTICAL DIRECTIONAL COUPLERS

This is a continuation of application Ser. No. 799,626 filed Nov. 19, 1985 (now abandoned).

BACKGROUND OF THE INVENTION

1. Field of the Invention

This invention relates to optical couplers and more particularly to optical directional couplers which are tunable to vary the output ratio between the output arms.

2. Description of the Related Art

Directional couplers are known in both integrated and fibre optics, and in general consist of one or more input lightpaths coupled to two or more output lightpaths, the degree of coupling of the light between the input lightpaths and the different output lightpaths being determined at the time of manufacture.

SUMMARY OF THE INVENTION

It is, however, an object of the present invention to provide a tunable optical directional coupler in which the output direction of the light can be varied as required whilst the coupler is in operation.

Accordingly, the invention provides an optical directional coupler comprising one or more input lightpaths coupled to two or more output lightpaths and a heater provided adjacent the junction of the coupler such that, in use, any desired output ratio can be achieved by heating at least one desired input/output lightpath so that the refractive index along the path or paths increases and thus provides a preferential pathway for light in the coupler.

The coupler may be formed either using optical fibres or in integrated optics and there are preferably at least as many output paths as there are input paths.

Preferably, the heater consists of a thin film of resistive metal such as Ni-Cr alloy deposited over the junction of the coupler by either electroplating or sputtering, which may be continuous over the whole area of the junction, or it may consist of several separate films deposited over parts of the junction forming particular lightpaths. The heater may extend from the junction area along the various input and output lightpaths if desired.

Connections may be made to the resistive film either by directly connecting electrodes to the film or by depositing a conductive film such as Ag or Aµ at the ends of the resistive film to form contacts for connection to a power source.

In one embodiment of a coupler according to the invention, a dual-mode light waveguide is provided between the input and output arms of the coupler and the heater is provided adjacent this dual-mode waveguide, so as to vary the refractive index of the waveguide and thus vary the ratio between the two modes coupled into the output arms.

The invention thus also provides a method of selectively varying the output ratio between two or more output lightpaths of an optical directional coupler by thermally altering the refractive index of at least one lightpath through the coupler.

The refractive index is preferably increased by heating the junction of the coupler, possibly by means of a metallic resistive film deposited over the junction.

BRIEF DESCRIPTION OF THE DRAWINGS

Several embodiments of tunable directional couplers according to the invention will now be described, by way of example, with reference to the drawings of which:

FIG. 5 shows a plan view of a fourth embodiment of an optical directional coupler; and FIG. 6 shows a plan view of a fifth embodiment of an optical directional coupler according to the invention.

DETAILED DESCRIPTION OF THE PREFERRED EMBODIMENTS

Figure 1:
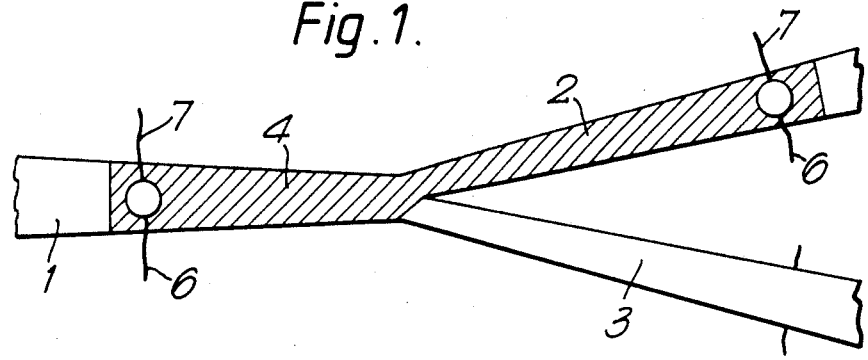
FIG. 1 shows a plan view of one embodiment of an optical directional coupler according to the invention.
Figure 2:
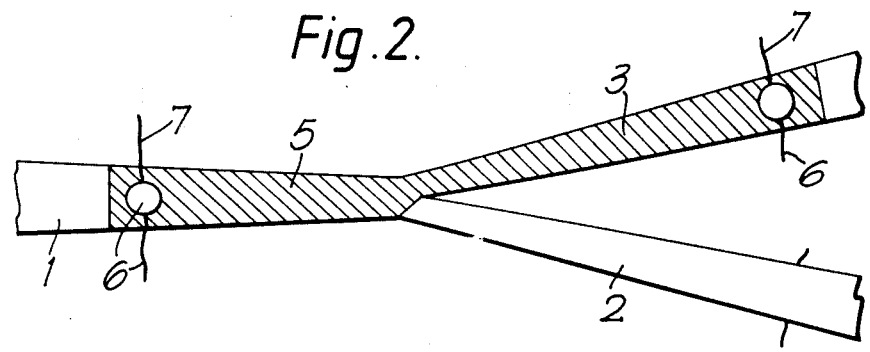
FIG. 2 shows an inverse view of the coupler of FIG. 1.

In the first embodiment of an optical directional coupler shown in FIGS. 1 and 2 for coupling the light from a first input fibre 1 to either one of two output fibres 2, 3, an ordinary bi-directional tapered coupler is first made by any desired method as are already well known in the art.

A thin film 4 of Ni-Cr alloy is then deposited on the fibres by either electroplating or sputtering. The film 4 covers just less than half the circumference of fibre 1 and continues through the junction of the coupler to cover a similar portion of fibre 2 as is shown in the plan view (FIG. 1).

A similar film 5 is also deposited over the opposite surfaces of fibres 1 and 3 in a similar manner, as shown in the inverse view (FIG. 2). Electrodes 6 having connection wires 7 for connection with a power supply (not shown) are provided on the portions of the films furthest from the junction point (as shown).

Light input into the fibre 1 can thus be selectively coupled to fibres 2 and 3 depending on which of the films 4 or 5 is connected to a power supply. As current is passed through the chosen film, it heats up the adjacent fibre and this increases the refractive index of that fibre compared to the normal (unheated) refractive index value and so the light is guided preferentially through the heated fibre.

Figure 3:
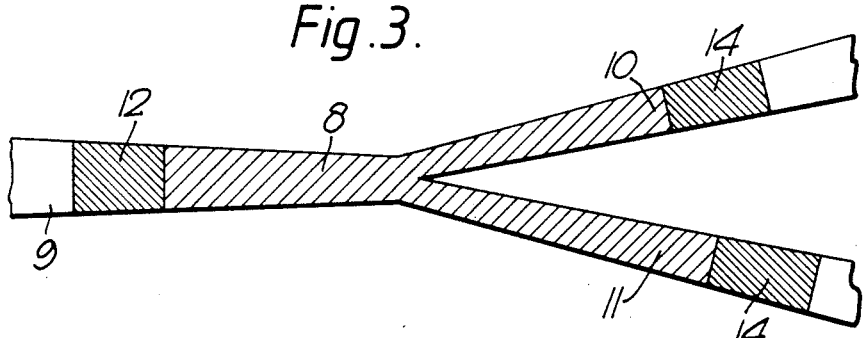
FIG. 3 shows a plan view of a second embodiment of an optical directional coupler according to the invention.

In a second embodiment, as shown in FIG. 3, a film 8 of Ni-Cr alloy is deposited over the whole surface of the coupler from the input fibre 9 to both of the output fibres 10 and 11. A secondary deposition of a conductive film of Ag forming a contact 12 is then provided at the input fibre end of the film and a further such contact 14 is deposited on each of the output fibre ends of the film.

Thus by connecting the power supply (not shown) between the contact 12 and either one of the contacts 14, current is passed through only part of the film 8 and light is preferentially guided into one of the output fibres 10 or 11 in a similar way to that described above. In this case however, since the film covers the whole surface of the fibres, the heating effect is greater.

By forming contacts by secondary deposition of conductive material, the contacts are provided further away from the junction of the coupler, which may be fragile, thus avoiding the risk of damage to the junction.

The contacts may in fact be deposited over the protective sheath of the fibres.

Figure 4:
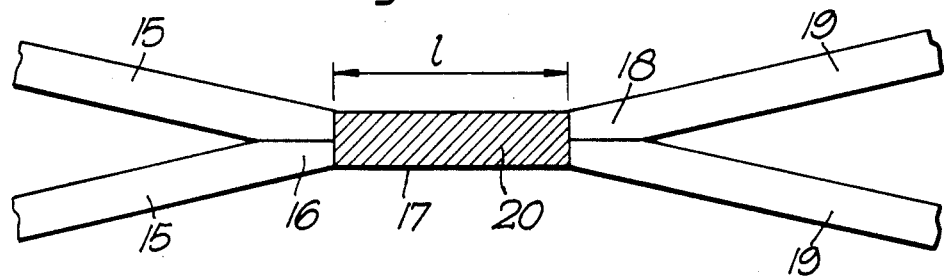
FIG. 4 shows a plan view of a third embodiment of an optical directional coupler.

The embodiment shown in FIG. 4 is a two-mode interference coupler fabricated in optical fibres but it could just as easily be made in integrated optics. The coupler has two input fibres 15 each of which can only support the fundamental mode of transmission. These fibres 15 are coupled by a tapered coupler 16 to a dual-mode fibre 17 supporting both the symmetric and the antisymmetric modes. Both modes are excited and propagate over a length of the dual-mode guide to a second tapered coupler 18. Depending on their phase difference at the end of the length 1 of the dual-mode guide, the light coupled into the two single-mode output fibres 19 varies according to the refractive index of the dual-mode guide 17. The dual mode guide could itself be a single dual mode fibre or indeed two single mode fibres forming a coupler by fusion or any other well known methods. A resistive film 20 is thus provided over the dual mode guide 17 to thermally vary the refractive index of the dual-mode guide 17 and thus control the ratio of light coupled into each of the output fibres 19.

FIG. 5 shows a similar coupler to that described above with reference to FIG. 4. In this case however the coupler is an X-coupler provided in integrated optics. The two input lightguides 21 cross-over at the junction 22 and become output lightguides 23. A heater film 24 is provided over the junction 22 so as to alter the refractive index and so control the ratio of light coupled into each of the output lightguides 23 in a similar manner to that described above.

FIG. 6 shows still a further embodiment of an optical coupler according to the invention. The coupler comprises first and second optical fibres 26 having a portion of their cladding removed from one side thereof. The fibres are held in grooves in substrates 27 positioned so that the portions of the fibres where the cladding is removed are in close facing proximity to each other to form a region of interaction or a junction for the coupler. Such a coupler is known from European Patent Application No. 0 038 023A. However in the coupler according to the invention, the fibres 26 each have a heater 28 provided over the region of interaction. Each heater comprises two films 29, 30 of resistive materials such as Ni-Cr alloy deposited over the whole circumference of each fibre with a small gap between them. The films are deposited over the fibres before the cladding is removed so that a small part of the films is removed when the cladding is removed. In order to tune the coupler to vary the ratio of light output from each of the fibres, current is passed through diagonally opposed films so as to increase the refractive index in the parts of the fibres adjacent the films compared to the refractive index of the parts of the fibres adjacent to other films. In this way a preferential lightpath is formed through the coupler, and by adjusting the amount of current through the films and by adjusting which films are used, the output ratio is controlled.

It will be appreciated that although the resistive films are described as being of Ni-Cr alloy, they could be of Ti, Ni, or any other resistive metal.

Further it will be apparent that the technique of having the heater formed of several separate resistive films as described with reference to FIG. 6 above is applicable to any of the optical couplers described and in all cases they may be manufactured either in integrated or fibre optics as appropriate.

The configuration of FIG. 6 in Integrated Optics resembles the known configuration used hitherto only with the Electrooptic Effect. However the present configuration which is not restricted to only one or two alternating micro-heaters can be used and indeed it is preferably used with silica, glass or other materials which have very small electrooptic coefficients.

I claim:

1. An optical directional coupler, comprising: one or more input lightpaths coupled at a junction to two or more output lightpaths, there being at least as many output paths as there are input paths; a heater provided adjacent the junction of the coupler, said heater including a plurality of thin films of resistive metal extending longitudinally from first ends at the junction along the various lightpaths to second ends remote from the junction, said first ends being separated longitudinally from each other by a gap; and a plurality of conductive films connected directly to, and extending longitudinally away from, the second ends of said resistive films away from the junction, said conductive films being electrically connected to a power source such that, in use, the output ratio of the coupler can be modified by heating at least one desired input/output lightpath, so that the refractive index along the path or paths increases and thus provides a preferential pathway for light through the coupler.

2. An optical directional coupler according to claim 1, wherein each resistive film is a NiCr alloy.

3. An optical directional coupler according to claim 2, wherein each resistive film is an electroplated layer.

4. An optical directional coupler according to claim 2, wherein each resistive film is a sputtered layer.

* * * * *